United States Patent [19]

Safaai-Jazi

[11] Patent Number: 4,976,512

[45] Date of Patent: Dec. 11, 1990

[54] NARROWBAND FIBEROPTIC SPECTRAL FILTER FORMED FROM FIBERS HAVING A REFRACTIVE INDEX WITH A W PROFILE AND A STEP PROFILE

[76] Inventor: Ahmad Safaai-Jazi, 6200 D. Terrace View, Blacksburg, Va. 24060

[21] Appl. No.: 333,572

[22] Filed: Apr. 5, 1989

[51] Int. Cl.$^5$ .......................... G02B 6/22; G02B 6/26; G02B 6/02; G01N 21/00
[52] U.S. Cl. ........................... 350/96.33; 350/96.15; 350/96.29; 356/73.1
[58] Field of Search .............. 350/96.15, 96.16, 96.29, 350/96.33; 356/73.1

[56] References Cited

U.S. PATENT DOCUMENTS

| | | | |
|---|---|---|---|
| 3,372,969 | 3/1968 | Snitzer | 350/96.29 |
| 3,761,716 | 9/1973 | Kapron et al. | 250/199 |
| 4,139,262 | 2/1979 | Mahlein et al. | 350/96.33 |
| 4,341,442 | 7/1982 | Johnson | 350/96.30 |
| 4,474,431 | 10/1984 | Bricheno | 350/96.15 |
| 4,556,279 | 12/1985 | Shaw et al. | 350/96.16 X |
| 4,606,605 | 8/1986 | Ashkin et al. | 350/96.31 |
| 4,650,281 | 3/1987 | Jaeger et al. | 350/96.33 |
| 4,673,270 | 6/1987 | Gordon | 350/96.15 |
| 4,738,503 | 4/1988 | Desurvire et al. | 350/96.15 |

Primary Examiner—Akm Ullah
Attorney, Agent, or Firm—Kenyon & Kenyon

[57] ABSTRACT

A narrowband optical fiber spectral filter comprises a fiber optic coupler formed from a W fiber and step index fiber. The W index fiber comprises a core having a high index of refraction. The core is surrounded by an inner cladding that has a very low index of refraction. An outer cladding surrounds the inner cladding and has an index of refraction that is greater than that of the inner cladding but less than that the core. The core of the step index fiber is surrounded by an outer cladding that preferably has the same index of refraction as the outer cladding of the first fiber. The two fibers are fused together to form a fiberoptic coupler that has an interaction region of predetermined length. The resulting fiberoptic coupler has different transmission characteristics for the two component fibers at which light can transfer between the fibers. The dispersion characteristics are the same for only a very narrow range of wavelengths. The resulting spectral filter thus has a narrower bandwidth than obtained by modifying other parameters of a fiberoptic spectral filter.

7 Claims, 2 Drawing Sheets

NARROWBAND FIBEROPTIC SPECTRAL FILTER FORMED FROM FIBERS HAVING A REFRACTIVE INDEX WITH A W PROFILE AND A STEP PROFILE

BACKGROUND OF THE INVENTION

The present invention relates to a fiberoptic spectral filter for multiplexing and demultiplexing signals on a fiberoptic waveguide.

The maximum information capacity of a single mode fiberoptic waveguide is limited by the spectral line width of the source and the speed of the detectors that receive the optical signal. Highly monochromatic light sources, such as lasers, are available that produce signals of very narrow spectral width. The electronics needed to process the signals, however, are limited in their ability to interpret the signals sent over a single mode fiberoptic cable. Fiberoptic communications systems thus cannot transmit all the information that a given fiberoptic cable is capable of carrying.

The amount of information that a fiberoptic communications system can carry can be increased by multiplexing the transmitted signals. Wavelength division multiplexing (WDM) allows one fiber to transmit several different optical channels. Each channel comprises light having a different wavelength, i.e. different color or different frequency. Techniques are known for launching different channels into the fiberoptic cable (multiplexing) and for separating the channels (demultiplexing). Demultiplexing requires one or more spectral filters to separate the different wavelengths.

Several techniques have been proposed for performing the wavelength division needed for demultiplexing. These techniques often involve using grating reflectors, dichroic filters and fused taper couplers. The grating reflectors and dichroic light filters require that the light leave the fiber to be multiplexed and subsequently returned to the fiber. This process results in a loss of signal power and may, in addition, require critical mechanical alignments that are complex and expensive to make.

A fused taper coupler is a WDM device that is made entirely of fiberoptic material. It can perform the multiplexing in a single mode fiberoptic system with very low insertion loss. Such a device has no need for complex mechanical alignments. A fiberoptic WDM device, however, must attain a high rejection of cross talk from neighboring channels.

Wavelength selective fiberoptic couplers may be made from identical or from dissimilar fibers. Light is transferred between the cores of the two fibers through their evanescent fields along an interaction region. The power transfer is strongly influenced by the propagation constant of the dominant modes of the fibers. The fibers are phase matched when the modes have equal propagation constants such that maximum power transfer occurs between the fiber cores. If the fibers are identical, however, their dominant modes are phase matched at all frequencies such that a complete transfer of power is possible at any frequency. The transfer is determined entirely by the coupling links of the fibers. Thus, such a coupling does not exhibit high frequency selectivity.

Fiberoptic couplers made from dissimilar fibers, such as shown in Gordon U.S. Pat. No. 4,673,270, can have a propagation constant in the dominant modes that is equal at only discrete frequencies. These frequencies correspond to the intersection points of the dispersion characteristics of the modes. The couplers can be phase matched at the intersection frequencies so as to create more sharply defined transmission curve. Fiberoptic couplers made from dissimilar fibers are therefor preferred as spectral filters.

Monochromatic light sources, such as lasers, emit light over a very narrow spectral bandwidth. It is possible to adjust or "tune" the frequency at which the laser emits light. Current lasers are limited in the range of wavelengths over which they can be tuned. Thus, the number of wavelengths at which light can be generated is inherently limited. Furthermore, fiberoptic bundles can transmit light efficiently only over certain wavelength ranges. It is thus desirable to select lasers that emit light over a narrow range of frequencies that correspond to the maximum transmission efficiency of a given fiberoptic material.

The constraints of both transmission efficiency and the limits imposed by tuning the laser light source place a premium on being able to transmit as many channels of information as possible over the most narrow frequency range possible. The ability to multiplex a number of channels over a narrow frequency range requires the ability to distinguish between channels that have very similar wavelengths. Laser light source can generally be tuned to the appropriate frequency. The major limit, however, is the ability to distinguish between these light sources at the demultiplexing end of the fiberoptic cable.

The ability to filter the various spectral components of a fiberoptic signal can be determined by adjusting a variety of the parameters in a fiberoptic coupler. For example, the difference the index of refraction of the cores of the fiberoptics, their separation, and the index of refraction of the surrounding cladding material can all be varied. The optimization of these various parameters, however, is a complex task that is not easily solved.

SUMMARY OF THE INVENTION

The present invention relates to a narrow band optical spectral filter that is made from a fiberoptic coupler. The parameters of the present invention have the unique attribute of possessing a very narrow spectral band width. The present invention thus enables the spectral filter to distinguish between wavelengths that are far more closely spaced than any spectral filter previously developed. For example, previous optical fiber spectral filters have been able to distinguish between light separated by 10 nm. The present invention, in contrast, can distinguish between 1 nm differences in wavelength at the resin of visible light. This result is both unexpected and obtained using a fiberoptic coupler having a particularly simple structure.

The present invention forms the spectral filter from a coupler made from W fiber and a step index fiber. The W index fiber comprises a core having a high index of refraction. The core is surrounded by an inner cladding that has a very low index of refraction. An outer cladding surrounds the inner cladding and has an index of refraction that is greater than that of the inner cladding but less than that the core. The core of the step index fiber is surrounded by an outer cladding that preferably has the same index of refraction as the outer cladding of the first fiber. The two fibers are fused together to form a tapered fiberoptic coupler that has an interaction region of predetermined length.

The resulting fiberoptic coupler has strikingly different dispersion characteristics for the two component fibers at which light can transfer between the fibers. The dispersion characteristics are the same for only a very narrow range of wavelengths. The resulting spectral filter thus has a narrower bandwidth than obtained by modifying other parameters of a fiberoptic spectral filter.

DETAILED DESCRIPTION

Figure 1:
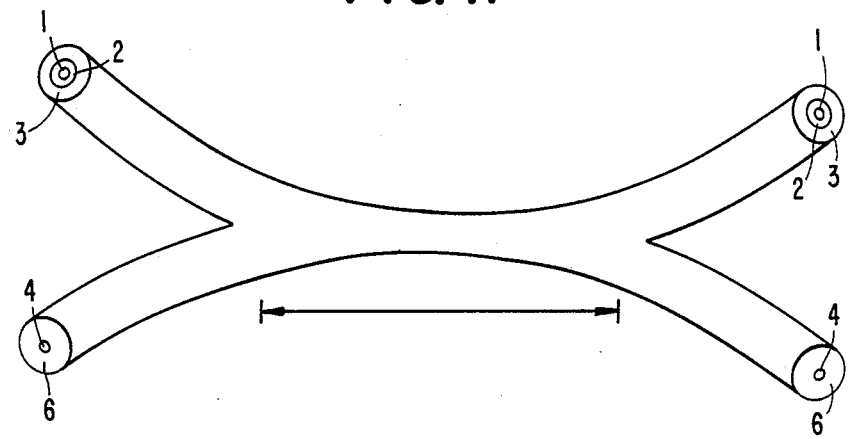
FIG. 1 shows a fiberoptic coupler in accordance with the present invention.
Figure 2:
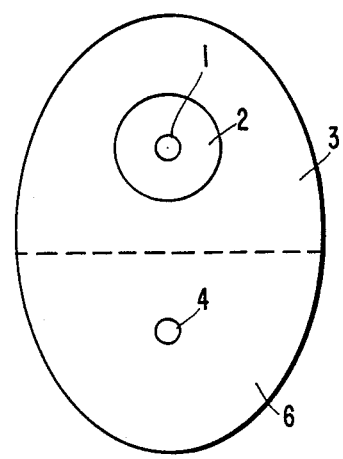
FIG. 2 shows a cross section of the fiberoptic coupler shown in FIG. 1.

FIG. 1 shows a fiberoptic coupler in accordance with the present invention. The W index fiber has a core region 1 surrounded by an inner cladding 2. The inner cladding has a lower index of refraction than the core. An outer cladding 3 surrounds the inner cladding and has an index of refraction that is higher than that of the inner cladding but lower than that of the core. The step index fiber has an outer cladding 6 surrounding core 4 and need have no inner cladding. The index of refraction of outer claddings 3 and 6 are preferably equal.

Cores 1 and 4 can be single mode fibers outside the interaction region. The cores are depicted as being parallel in the interaction region. The core fibers are separated by a predetermined distance d in the interaction region.

The separation distance places cores 1, 4 within the evanescent field of the light in either fiber for a given range of wavelengths. For purposes of explaining the invention it will be assumed that a scaler wave analysis applies and that the cores 1 and 4 are weakly guiding. The evanescent field then decays exponentially in the cladding. The amplitude of the field of the light in each core is a function of the axial coordinate z. Assuming that the dominant $LP_{01}$ mode is y-polorized, the evanescent field in the step index fiber and in the W fiber are respectively expressed as:

$$E_{y1} = a_1(Z)\Psi_1(r) \exp(-j\beta_1 z); \text{ and}$$

$$E_{y2} = a_2(Z)\Psi_2(R) \exp(-j\beta_2 z)$$

Where
$\beta_1$ and $\beta_2$ are propagation constants; and
$\Psi_1$ and $\Psi_2$ are transverse field expressions for the $LP_{01}$ mode for the respective fibers.

The exchange of power between the fibers is governed by the change in the Z dependent coefficients $a_1$ and $a_2$. The expressions for the fibers are given by the following sets of equations:

For the step-index fiber:

$$\psi_1(r) = \begin{cases} AJ_0(k_1 r)/J_0(k_1 r_1) & r < r_1 \\ AK_0(k_2 r)/K_0(k_2 r_2) & r > r_1 \end{cases}$$

Where $$k_1 = \frac{2\pi}{\lambda} [n_0^2 (1 + 2\Delta_1) - \bar{\beta}^2]^{\frac{1}{2}}$$

$$k_2 = \frac{2\pi}{\lambda} (\bar{\beta}^2 - n_0^2)^{\frac{1}{2}}$$

A is a constant coefficient determined such that the $LP_{01}$ mode becomes orthonormal; i.e.

$$\int_0^\infty n_1(r) \psi_1^2(r) \, r \, dr = Z_0/\pi, \text{ where } Z_0 = (\mu_0/\epsilon_0)^{\frac{1}{2}}$$

where
$J_0$, $K_0$ are the Bessel and modified Bessel functions of zeroth-order; and
$n_0$ is the index of refraction in the surrounding cladding.

For the W index fiber:

$$\psi_2 = \begin{cases} BJ_0(\hat{k}_1 r) & r < r_2 \\ B[\eta_1 I_0(\hat{k}_2 r) + \eta_2 K_0(\hat{k}_2 r)] & r_2 < r < r_3 \\ B\eta_3 K(\hat{k}_2 r) & r > r_3 \end{cases}$$

Where $$k_1 = \frac{2\pi}{\lambda} [n_0^2 (1 + 2\Delta_2) - \bar{\beta}^2]^{\frac{1}{2}}$$

$$k_2 = \frac{2\pi}{\lambda} [\bar{\beta}^2 - n_0^2 (1 - 2\Delta_3)]^{\frac{1}{2}}$$

and B is a constant coefficient determined such that the $LP_{01}$ mode becomes orthonormal; i.e., $$\int_0^\infty n_2(r) \psi_2(r) \, r \, dr = Z_0/\pi$$

The radial coordinate r in the above equation refers to the axis of the W fiber, and $\eta_1$, $\eta_2$ and $\eta_3$ are determined through the imposition of boundary conditions at $r = r_1$ and $r = r_2$.

The z dependant coefficient $a_1$ and $a_2$ account for the exchange of power between cores 1 and 4. Snyder and Love, *Optical Waveguide Theory*, Chapmann and Hall, Ch. 29 (1983) have shown that weakly coupled parallel waveguides are governed by the following set of differential equations:

$$da_1/dz = -j[c_{11}a_1 + c_{12} \exp(j\Delta\beta z)a_2]$$

$$da_2/dz = -j[c_{22}a_2 + c_{21} \exp(-j\Delta\beta z)a_1]$$

where $$C_{pq} = (\omega\epsilon_0/4) \int_S (n^2 - n_p^2) \psi_p \psi_q \, ds; \ p, q = 1, 2$$

$$\Delta\beta = \beta_1 - \beta_2.$$

n refers to the refractive index of the composite waveguide;
$n_p$ refers to the W index fiber for $p = 2$ and that of the step index fiber for $P = 1$;
S is the cross section of the composite fiberoptic coupler;

$\epsilon_0$ is the cross section of the composite fiberoptic coupler;

$\epsilon_0$ is the free space permittivity; and $\omega$ is the angular frequency.

The term $n^2 - n_{92}^2$ vanishes over the common cladding region for $p=1$ or $2$. Thus, the integral need be evaluated only over the core regions of the appropriate fibers. Furthermore, the self coupling coefficients $c_{11}$ and $c_{22}$ are much smaller than the cross coupling coefficients $c_{12}$ and $c_{21}$ because the former coefficients correspond to exponentially decaying functions of the radial coordinate, whereas only one of the later coefficients is exponentially decaying.

The forgoing differential equation can be solved by eliminating $a_1$ and solving for $a_2$. The resulting differential equation can be solved subject to the condition that the entire power at $z=0$ at the step index interface causes $a_2(0)=0$. The power coupled to the W index guide over a distance z is thus obtained as $$P_2 = |a_2(z)|^2 = |C_{12}|^2 \frac{\sin^2(sz)}{s^2}$$

Where $$s = [\tfrac{1}{4}(\Delta\beta + c_{11} - c_{22})^2 + c_{12}c_{21}]^{\tfrac{1}{2}}$$

The foregoing equation shows that $P_2$ is a function of wavelength that assumes a maximum of value when $s^2$ is minimum and $sz = \pi/2$. More generally, $sz = \pi/2 + \pi m$, where m is an integer. The coefficients $c_{11}$ and $c_{22}$ are much smaller than $c_{12}$ and $c_{21}$ and therefor do not influence s strongly. The minimum of s is obtained when $\Delta\beta=0$, i.e. at a wavelength $\lambda = \lambda_o$ corresponding to the intersection of the dispersion characteristics of the two coupled fiber waveguides. The wavelengths and separation can be chosen appropriately such that maximum power transfer occurs between the step index fiber and the W index fiber. Furthermore, wavelengths that differ significantly from the transmission wavelength are sharply attenuated in power. This increase is substantially greater than that produced by merely coupling two dissimilar fibers. Bandwidths of less than 10 nm are possible.

Figure 3:
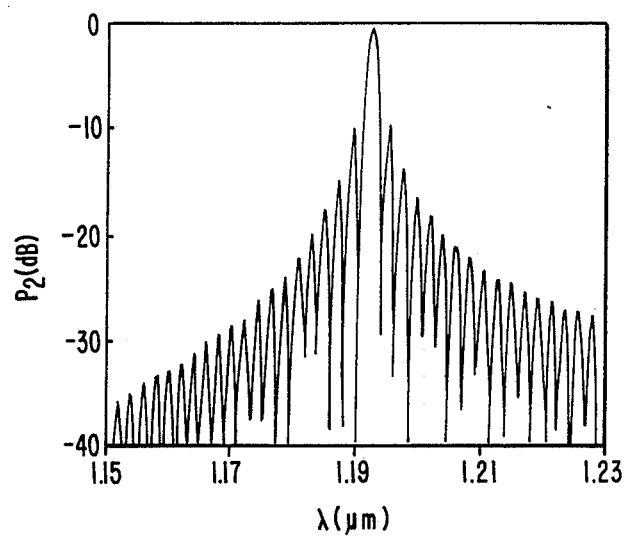
FIG. 3 shows a plot of the transmission characteristic of the fiberoptic coupler shown in FIGS. 1 and 2.

FIG. 3 illustrates the transmission characteristics of a spectral filter of the present invention. The vertical axis is plotted in decibels. Assuming parameters for the index fiber of a core radius of 2.65 $\mu m = r_1$ and radius for the W index fiber $r_2 = 2.36$ $\mu m$ and $r_3 = 3.77$ $\mu m$, a separation of $d = 10$ $\mu m$ can give an acceptable filtering. Once the coupling coefficients are determined, the coupling length is given by $$L = \pi/[c_{11}c_{22})^2 + 4c_{12}c_{21}]^{\tfrac{1}{2}}$$

The transfer function for the filter is then expressed as $$P_2(\lambda) = \left\{ \frac{C_{12}}{S(\lambda)} \sin[s(\lambda)L] \right\}^2$$

This transmission characteristic is illustrated in FIG. 3. The horizontal axis corresponds to wavelength. A sharply defined transmission maximum is shown near 1.19 $\mu m$. The transmission is attenuated by more than 20 dB at only 0.03 $\mu m$ away from maximum.

The performance of the spectral filter of the present invention is strongly influenced by the particular values of the parameters chosen. A wider separation of the cores of the wave guides tends to narrow the bandwidth. Larger differences between the inner and outer claddings of the W fiber create larger differences in the slope of the dispersion curves of the fibers which results in narrower bandwidth. Furthermore, the parameters of the W index fiber may be chosen so that the $LP_{01}$ mode exhibits a nonzero cutoff which may be used to further increase the slope difference and further narrow the bandwidth.

Figure 4:
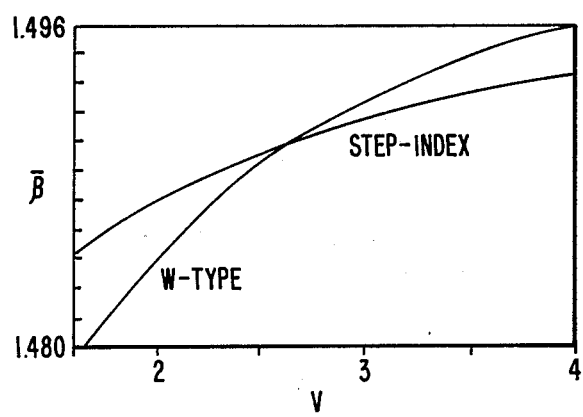
FIG. 4 shows the change with frequency of the propagation constants of the step index fiber and W index fiber having the transmission characteristic shown in FIG. 3.

FIG. 4 illustrates the normalized propagation constant for the $LP_{01}$ mode of the step index and W index fibers versus normalized frequency for the transmission characteristic in FIG. 3. The difference in the slope between the two curves is the measure of the sharpness of the cutoff of the filter.

Numerous other parameters may be adjusted to change the frequency sensitivity of the spectral filter. For example, the interaction region can be modified by aligning the fiberoptic cores in a non-parallel manner. Additional changes in the index of refraction of the fiberoptic cladding can be made. However, reflections occurring at the interface between the claddings can reduce the efficiency of the fiberoptic coupler. It is therefore preferred that only one of the fibers have an inner cladding and that the outer cladding of both fibers have the same index of refraction.

The foregoing specification is intended to illustrate the present invention. The specification should not be considered to limit the invention. Variations and changes may be made by those skilled in the art without departing from the spirit of the invention set forth in the appended claims.

What is claimed is:

1. A fiberoptic spectral filter, comprising:
   a first fiberoptic core;
   a first inner cladding surrounding said first fiberoptic core;
   a first outer cladding surrounding said first inner cladding;
   a second fiberoptic core;
   a second outer cladding surrounding said second fiberoptic core; and
   an interaction region in which the first and second fiberoptic cores are brought within the evanescent field of light being transmitted in the other at a predetermined wavelength;
   wherein the first fiberoptic core has a higher index of refraction than the first inner cladding;
   the second fiberoptic has a higher index of refraction than the second outer cladding;
   the first outer cladding has a higher index of refraction than the first inner cladding; and
   the first outer cladding has the same index of refraction as the second outer cladding.

2. A fiberoptic spectral filter as claimed in claim 1, wherein the spectral filter has a bandwidth of less than 10 nm.

3. A fiberoptic spectral filter as claimed in claim 2, wherein the spectral filter has a bandwidth of less than one nm.

4. A narrowband fiberoptic spectral filter, comprising:
   a first optical fiber;
   a second optical fiber; and
   an interaction region in which the first optical fiber is positioned within the evanescent field of light of a predetermined wavelength in the second optical fiber such that the bandwidth of the spectral filter is less than 10 nm.

5. A narrowband spectral filter as claimed in claim 4, wherein the spectral bandwidth is less than 1 nm.

6. A fiberoptic spectral filter, comprising:
a first fiberoptic core having an index of refraction;
a first inner cladding completely surrounding the first fiberoptic core, the first inner cladding having a lower index of refraction than the first fiberoptic core;
a first outer cladding completely surrounding the first inner cladding, the first outer cladding having an index of refraction that is greater than the first inner cladding and less than the index of refraction of the first fiberoptic core;
a second fiberoptic core having an index of refraction;
a second outer cladding surrounding the second fiberoptic core, the second outer cladding having an index of refraction that is less than the index of refraction of the second fiberoptic core and equal to the index of refraction of the first outer cladding; and
an interaction region in which the first and second fiberoptic cores are brought within the evanescent field of light being transmitted in the other at a predetermined wavelength.

7. A narrowband fiberoptic spectral filter, comprising:
a first fiberoptic core having an index of refraction;
a first inner cladding that completely surrounds the first fiberoptic core, the first inner cladding having an index of refraction that is less than the index of refraction of the first fiberoptic core;
a first outer cladding that completely surrounds the first inner cladding, first outer cladding having an index of refraction that is greater than the index of refraction of the first inner cladding but less than the index of refraction of the first fiberoptic core;
a second fiberoptic core having an index of refraction equal to the index of refraction of the first fiberoptic core;
a second outer cladding that completely surrounds the second fiberoptic core and is in contact therewith, the second outer cladding having a second index of refraction that is less than the index of refraction of the second fiberoptic core and equal to the index of refraction of the first outer cladding; and
an interaction region in which the second fiberoptic core is positioned within the evanescent field of a predetermined wavelength of light in the first fiberoptic core such that the narrowband fiberoptic spectral filter has a bandwidth of less than 10 microns at the predetermined wavelength of light.

* * * * *